United States Patent [19]

Kim et al.

[11] 4,318,724

[45] Mar. 9, 1982

[54] GLASS FIBER-FORMING APPARATUS

[75] Inventors: Kwan Y. Kim, Pickerington; Michael T. Pellegrin, Newark, both of Ohio

[73] Assignee: Owens-Corning Fiberglas Corporation, Toledo, Ohio

[21] Appl. No.: 221,112

[22] Filed: Dec. 29, 1980

[51] Int. Cl.³ .......................................... C03B 37/025
[52] U.S. Cl. ............................................. 65/1; 65/12
[58] Field of Search ..................................... 65/1, 2, 12

[56] References Cited

U.S. PATENT DOCUMENTS

| 3,574,581 | 4/1971 | Strickland et al. | 65/1 |
| 3,979,195 | 9/1976 | Strickland | 65/1 |
| 4,032,314 | 6/1977 | Coggin | 65/1 |

FOREIGN PATENT DOCUMENTS 2021092 11/1979 United Kingdom .

*Primary Examiner*—Robert L. Lindsay, Jr.
*Attorney, Agent, or Firm*—Ronald C. Hudgens; Kenneth H. Wetmore; Philip R. Cloutier

[57] ABSTRACT

The invention relates to apparatus for producing fibers from heat softened mineral material, such as glass. More specifically, this invention relates to an orifice plate for a glass fiber drawing bushing of the type having a flat undersurface and a plurality of orifices formed therethrough with the improvement comprising grooves formed in the undersurface surrounding each orifice. The grooves are spaced from one another such that they not in intersecting relationship.

14 Claims, 6 Drawing Figures

GLASS FIBER-FORMING APPARATUS

TECHNICAL FIELD

The invention relates to apparatus for the production of fibers from heat softened mineral material, such as glass. More specifically, this invention relates to apparatus for the production of glass fibers using a tipless glass fiber forming, or drawing, bushing, that is, a bushing having a generally flat undersurface, or bottom wall. The apparatus comprises grooves in the undersurface of the bushing encircling or surrounding each orifice, said grooves being spaced from one another such that they are not in intersecting relationship.

BACKGROUND OF ART

It has been conventional in the glass fiber forming art to use bushings that have orificed projections to flow streams of molten glass material for attenuation into fibers. By using such orificed projections, the undersurface or bottom wall of such bushings is less likely to flood with molten glass material during an interruption of the fiber forming process. During an interruption of the process, the exiting glass of a tipped bushing will generally form beads at the exit of each tip rather than flood across the bottom wall to form a large mass of glass covering the undersurface of the bushing.

However, by using bushings which include tips or orifice projections, one is physically limited by the walls of the tips to certain maximum orifice densities in the bottom wall. If the tips or projections can be eliminated from the bottom surface of the bushing, the orifices can be packed more closely together, and thus, higher orifice density bushings can be utilized.

The use of tipless bushings, i.e., bushings having a generally flat undersurface, is described in U.S. Pat. No. 3,905,790 and in British Pat. No. 1,498,184.

However, utilization of such high orifice density tipless bushings has been limited because of the difficulty in running such bushings and in restarting such bushings after an interruption. Improved apparatus is desired for the production of glass fibers through tipless bushings.

SUMMARY OF THE INVENTION

The present invention comprises an orifice plate for a glass fiber forming bushing of the type having a flat undersurface and a plurality of orifices formed therethrough, the improvement comprising grooves formed in the undersurface encircling each orifice. The grooves are spaced from one another such that they are not in intersecting relationship.

The present invention comprises an orifice plate for a glass fiber drawing bushing of the type in which the orifice plate has a flat undersurface and a large number of orifices so closely arranged that molten glass produced at adjacent orifices easily coalesce to cause flooding over the undersurface and cooling air is required to be directed toward the undersurface of the orifice plate so as to prevent the flooding, the improvement comprising grooves formed in the undersurface surrounding each of the orifices. The grooves are spaced from one another such that they are not in intersecting relationship.

An object of the invention is to provide an improved apparatus for the production of glass fibers.

Another object of the invention is to provide an improved tipless bushing apparatus.

These and other objects of the invention will become more apparent as the invention is described hereinafter in detail with reference to the accompanying drawings.

DESCRIPTION OF THE PREFERRED EMBODIMENT

It is to be understood that the invention is not limited in its application to the details of construction and arrangement of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

Figures 1, 2, 3, 4:
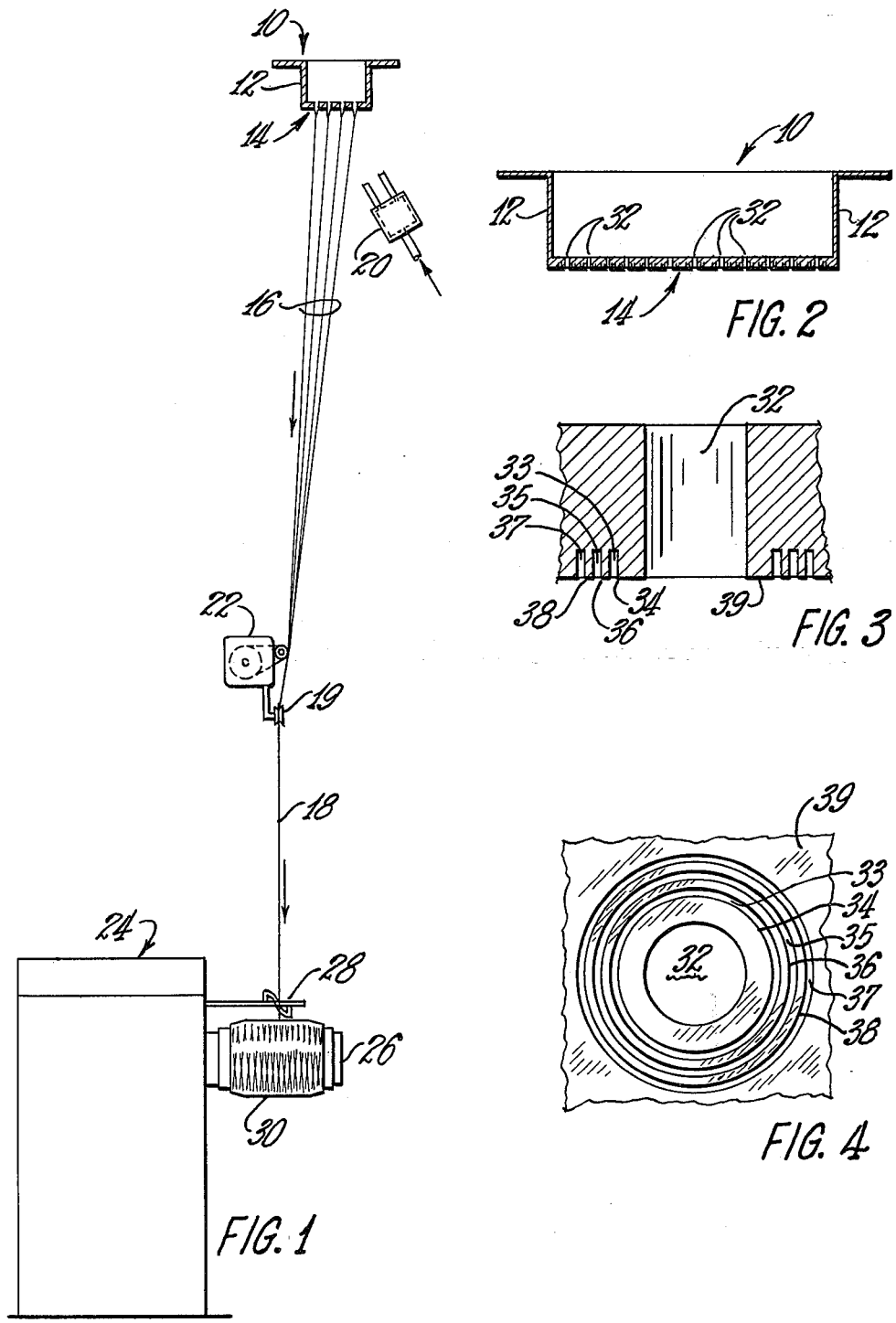
FIG. 1 is a semi-schematic elevational view of a fiber forming apparatus embodying the invention.
FIG. 2 is an enlarged sectional view of the bushing illustrated in FIG. 1.
FIG. 3 is a partial sectional view of the bottom wall of the bushing illustrated in FIG. 2.
FIG. 4 is a partial bottom view of the bushing illustrated in FIG. 2.

Referring to the drawings in detail, FIG. 1 illustrates a fiber forming operation. Mineral material, such as glass, is maintained in a molten condition in bushing or stream feeder assembly 10 from which a plurality of streams of heat softened glass is emitted for attenuation into fibers.

The bushing is constructed of a platinum-rhodium alloy or other heat resistant material and comprises upwardly extending sidewalls 12 and bottom wall or orifice plate assembly 14. Streams of molten glass are emitted from the orifices in the bottom wall and are attenuated into fibers 16 by winder apparatus 24. The fibers are coated by size applicator 22 and gathered into strand 18 by gathering shoe 19. The strand is reciprocated by traverse 28 as it is collected into package 30 on winder collet 26.

To control the glass fiber forming environment, blower means 20 is provided. Such blower means are described in more detail, for example, in U.S. Pat. Nos. 4,202,680 and 3,905,790, as well as in British Pat. No. 1,498,184.

Bushing assembly 10 is shown in more detail in FIGS. 2 through 4. The bottom wall is shown to have a plurality of orifices 32 for the passage of molten mineral material therethrough. Each orifice is surrounded or encircled by grooves formed in the undersurface. As shown in FIG. 3, there are three concentric grooves 33, 35, and 37 encircling orifice 32. The grooves have a rectangular cross-section with their inside sharp edged corners 34, 36 and 38 respectively at the bushing bottom surface 39. The grooves can have a width in the range of from about 0.1 mm to about 1.5 mm and a depth in the range of from about 0.1 mm to about 1.5 mm. It is within the scope of the invention that there be only one groove surrounding each orifice and the groove may have other cross-sectional shapes. Some examples of other cross-sectional shapes are shown in later figures.

The orifices of the bottom wall are arranged in highly dense fashion. In the absence of the grooves, the orifices are in a flooding relationship such that the molten glass material flowing through the orifices tends to flood together into a mass of molten glass material covering the undersurface of the bushing during a fiber forming interruption. The orifice density is generally in the range of 75 orifices per square inch (11 orifices per square centimeter) or greater. For example, the orifice density can be in the range of from about 100 orifices per square inch (15 orifices per square centimeter) to about 250 orifices per square inch (39 orifices per square centimeter).

The grooves restrict movement of molten glass material along the undersurface of the bushing between orifices. The grooves are generally small in cross-sectional area and have a sharp edge at the undersurface of the bushing.

Figure 5:
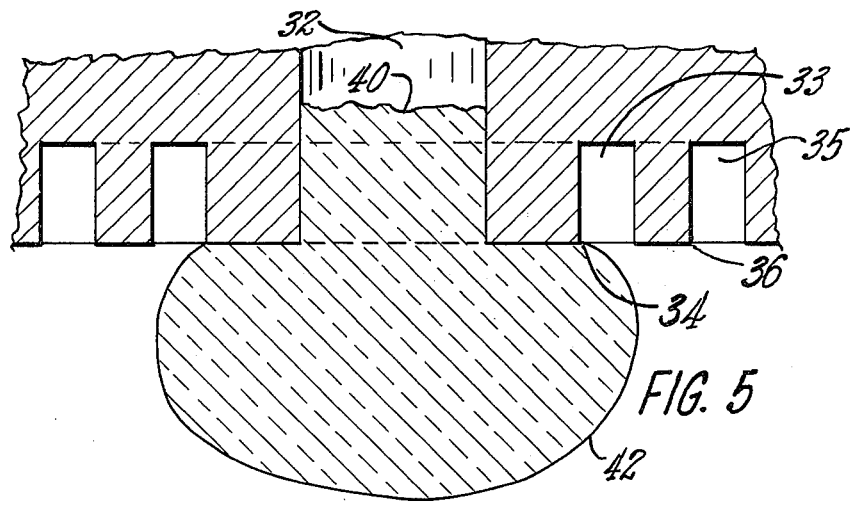
FIG. 5 is a partial sectional view of the bottom wall of the bushing of FIG. 2 with glass flowing through an orifice to a first groove.
Figure 6:
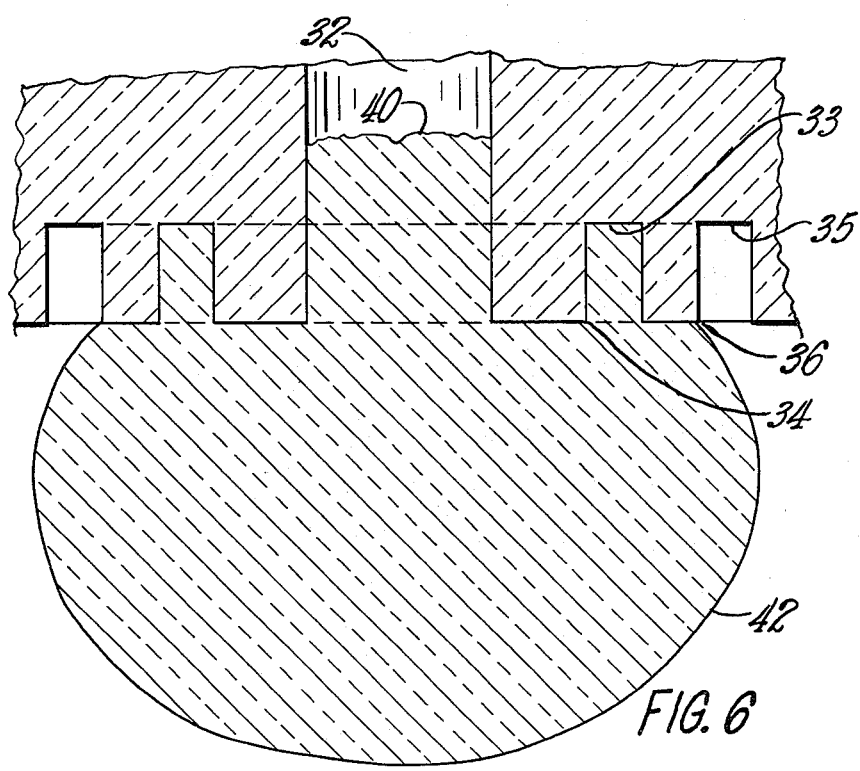
FIG. 6 is a partial sectional view of the bottom wall of the bushing of FIG. 2 with glass flowing through an orifice to a second groove.

FIGS. 5 and 6 illustrate the grooves resisting glass flow across the bushing undersurface. Molten glass material 40 flows through orifice 32 and forms a molten glass mass 42 on the undersurface of the bushing during a fiber forming disruption. The molten glass material flowing across the land area surrounding the orifice is resisted from proceding further when it encounters the sharp edge of a groove. In FIG. 5, glass 42 has flooded to the sharp edge 34 of groove 33; additional flow of the glass is resisted and a bead is formed. In FIG. 6 glass has flooded into groove 33 and moved further along the undersurface to sharp edge 36 of groove 35. Continued flow of the glass material is resisted and a bead has formed. Thus, during operation of such a glass fiber forming apparatus the tendency of such a bushing to flood is reduced.

FIGS. 7 through 10 show other embodiments in accordance with the invention.

Figure 7:
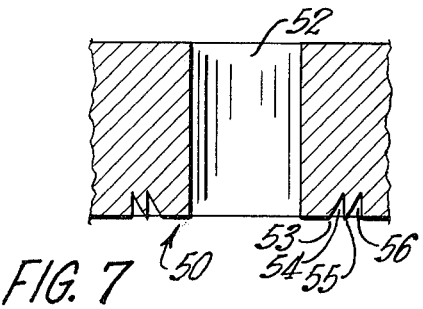
FIG. 7 is a partial sectional view of the bottom wall of a bushing in accordance with the invention.

FIG. 7 shows a portion of bushing bottom wall 50. Orifice 52 is surrounded by grooves 54 and 56. These grooves have sharp edges 53 and 55 respectively at the undersurface of the bottom wall. As shown, these grooves have a triangular cross-section.

Figure 8:
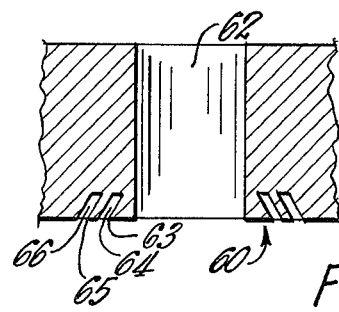
FIG. 8 is a partial sectional view of the bottom wall of a bushing in accordance with the invention.

FIG. 8 shows a portion of bushing bottom wall 60. Orifice 62 is surrounded by two grooves 64 and 66. These grooves have sharp edges 63 and 65 respectively and are of a parallelagram shaped cross-section.

Figure 9:
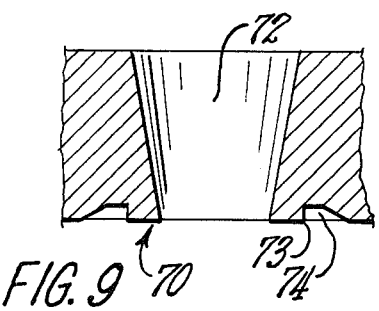
FIG. 9 is a partial sectional view of the bottom wall of a bushing in accordance with the invention.

FIG. 9 shows a portion of a bushing bottom wall 70. In this embodiment, orifice 72 has a conical shape rather than a cylindrical shape as shown in the other embodiments. It is within the scope of the invention that the orifices can be of other shapes. For example, the orifices can be of a counterbored cylindrical shape such that the upper diameter of the orifice would be either larger or smaller than the bottom diameter of the orifice. In FIG. 9, groove 74 has a trapezoidal cross-sectional shape with sharp edge 73.

Figure 10:
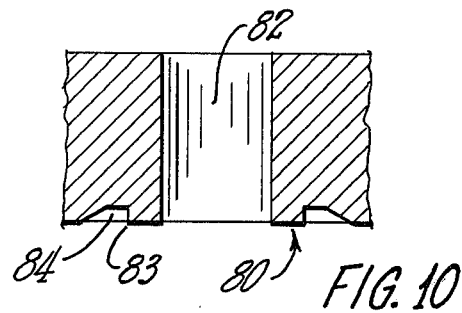
FIG. 10 is a partial sectional view of the bottom wall of a bushing in accordance with the invention.

FIG. 10 shows a portion of a bushing bottom wall 80. In this embodiment orifice 82 has a cylindrical shape and is surrounded by groove 84. The groove has a trapezoidal cross-sectional shape and sharp edge 83 at the undersurface of the bushing toward the orifice.

Having described the invention in detail, it will be understood such specifications are given for the sake of explanation. Various modifications and substitutions, other than those cited, may be made without departing from the scope of the invention as defined in the following claims.

INDUSTRIAL APPLICABILITY

The present invention would be useful in the mineral fiber forming art and, in particular, in the glass fiber forming art.

We claim:

1. An orifice plate for a glass fiber forming bushing of the type having a flat undersurface and a plurality of orifices formed therethrough, the improvement comprising grooves formed in said undersurface encircling each orifice, said grooves being spaced from one another such that they are not in intersecting relationship.

2. The orifice of claim 1, wherein said grooves have a width in the range of from about 0.1 mm to about 1.5 mm and a depth in the range of from about 0.1 mm to about 1.5 mm.

3. The orifice plate of claim 1, wherein said grooves have a trapezoidal cross section.

4. The orifice plate of claim 3, wherein said grooves have a rectangular cross section.

5. The orifice plate of claim 1, wherein said grooves have a triangular cross section.

6. The orifice plate of claim 1, wherein said orifice plate is made of a platinum-rhodium alloy.

7. The orifice plate of claim 1, wherein a plurality of concentric grooves encircle each orifice.

8. An orifice plate for a glass fiber drawing bushing of the type in which said orifice plate has a flat undersurface and a large number of orifices so closely arranged that molten glass produced at adjacent orifices easily coalesce to cause flooding over said undersurface and cooling air is required to be directed toward said undersurface of the orifice plate so as to prevent the flooding, the improvement comprising grooves formed in said undersurface surrounding each of said orifices, said grooves being spaced from one another such that they are not in intersecting relationship.

9. The orifice plate of claim 8, wherein the grooves have a rectangular cross section.

10. The orifice plate of claim 8, wherein a plurality of concentric grooves surround each orifice.

11. Apparatus for the production of glass fibers comprising:
 a. a tipless bushing having orifices for delivery of streams of molten glass material for attenuation into fibers, the bottom wall having separate grooves encircling each orifice, said grooves being spaced from one another such that they are not in intersecting relationship;
 b. air flow means for directing air toward the bottom wall in an amount and at a velocity sufficient to render the streams attenuable to fibers; and
 c. means for attenuating fibers from the streams.

12. The apparatus of claim 11, wherein the grooves have a rectangular cross section.

13. The apparatus of claim 11, wherein a plurality of concentric grooves encircle each orifice.

14. The apparatus of claim 11, wherein the directed air impinges on the bottom wall.

* * * * *